United States Patent [19]

Alford

[11] 4,165,655

[45] Aug. 28, 1979

[54] VIBRATING SCREEN APPARATUS HAVING DUAL FUNCTION ECCENTRIC WEIGHTS

[75] Inventor: Peter B. Alford, Cheshire, Oreg.

[73] Assignee: El-Jay, Inc., Eugene, Oreg.

[21] Appl. No.: 825,565

[22] Filed: Aug. 18, 1977

[51] Int. Cl.[2] .............................................. F16H 33/00

[52] U.S. Cl. ....................................................... 74/61

[58] Field of Search ................. 74/61, 87; 198/220 D; 209/367, 366.5, 363, 364

[56] References Cited

U.S. PATENT DOCUMENTS

| | | | |
|---|---|---|---|
| 3,442,381 | 5/1969 | Johnson | 74/61 |
| 3,625,074 | 12/1971 | Waschulewski et al. | 74/61 |
| 3,875,811 | 4/1975 | Fuller | 74/61 |

*Primary Examiner*—Samuel Scott
*Assistant Examiner*—Wesley S. Ratliff, Jr.
*Attorney, Agent, or Firm*—Haven E. Simmons; James C. Nemmers

[57] ABSTRACT

A vibrating screen apparatus having plural unbalanced shaft assemblies to impart vibratory movement to a screen. Each screen assembly has a gear hub to which a pair of eccentric weights are secured in flanking relationship. The shaft assemblies are drivingly connected to one another by an arrangement including an annular gear mounted on the gear hub. The annular gear has such a special relationship to the weights and gear hub, that the act of clamping the weights in place on the gear hub simultaneously clamps the annular gear in place.

4 Claims, 7 Drawing Figures

FIG. 3
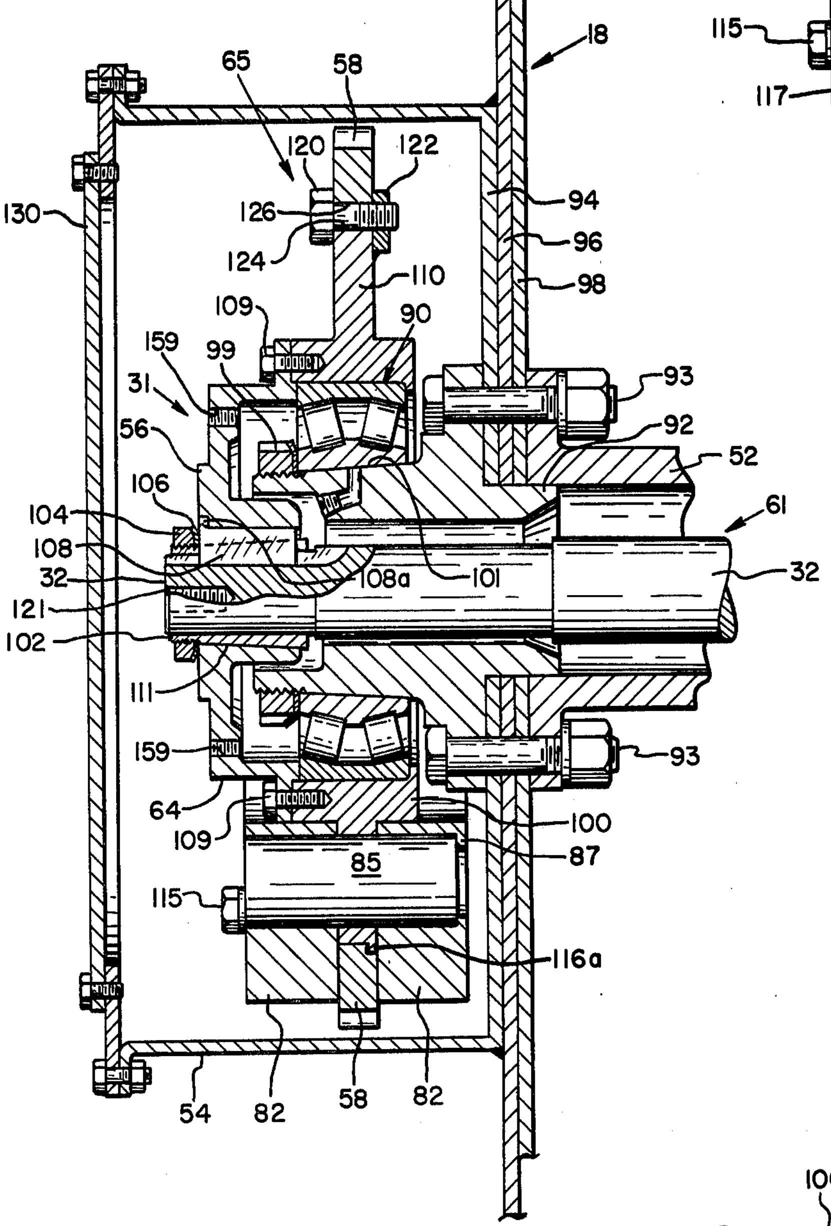
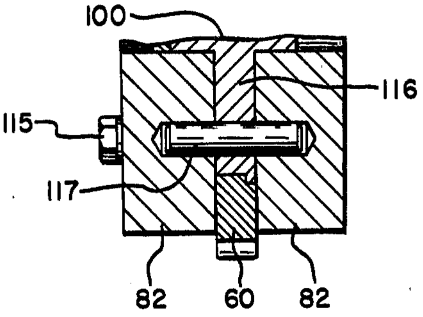
FIG. 7
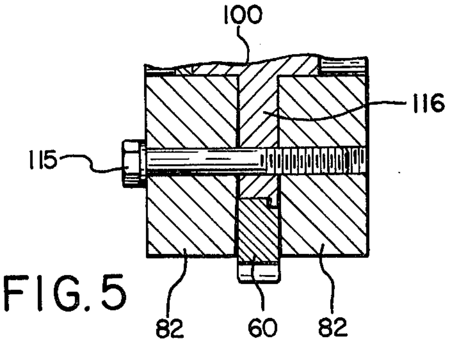
FIG. 5
FIG. 6
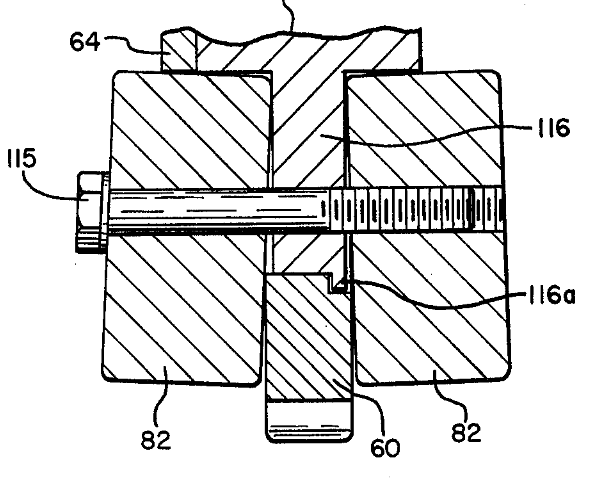

VIBRATING SCREEN APPARATUS HAVING DUAL FUNCTION ECCENTRIC WEIGHTS

BACKGROUND OF THE INVENTION

The co-pending application of Louis W. Johnson, entitled "Improved Vibrating Screen Apparatus", Ser. No. 638,535, filed Dec. 8, 1975, now abandoned, discloses a vibrating screen apparatus with plural unbalanced shaft assemblies. Each shaft assembly includes a gear hub and an annular gear. In at least one of these shaft assemblies the gear hub and its shaft can be turned relative to the annular gear when a locking mechanism between the annular gear and the gear hub is released, to facilitate varying the angle of stroke imparted to the vibrating screen. In the previous construction, the locking mechanism comprised a clamp at the mating edges of the gear hub and the annular gear. When the annular gear is made relatively thin (to save metal) this clamping arrangement tends to bow it outwardly making for operating difficulties.

SUMMARY OF THE INVENTION

In the present invention, the above difficulty is removed by providing such a dimensional relationship of the annular gear and the gear hub and weight means, that when the weights are clamped in place, they simultaneously clamp the annular gear fixedly onto its gear hub without imposing any bowing forces to the annular gear.

An object of the invention is to provide an improved vibrating apparatus having novel means for mounting the annular gear on its gear hub.

Another object of the invention is to provide a vibrating apparatus in which a pair of weights performs a dual function of providing an eccentric mass while at the same time clamping the annular gear securely in place.

In the drawings

FIG. 3 is a sectional view taken along line 3—3 of FIG. 2 showing the details of an unbalanced shaft assembly;

FIG. 5 is an enlarged fragmentary section taken along line 5—5 of FIG. 2;

FIG. 6 is an enlarged view of FIG. 5 with dimensions exaggerated to better show an important feature of the invention; and FIG. 7 is an enlarged fragmentary section taken along line 7—7 of FIG. 2.

Figure 1:
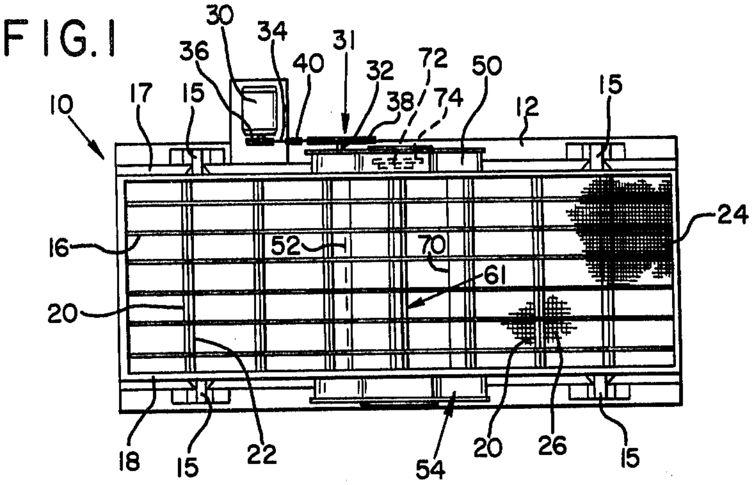
FIG. 1 is a top plan view of a vibrating screen apparatus forming one embodiment of the invention.
Figure 2:
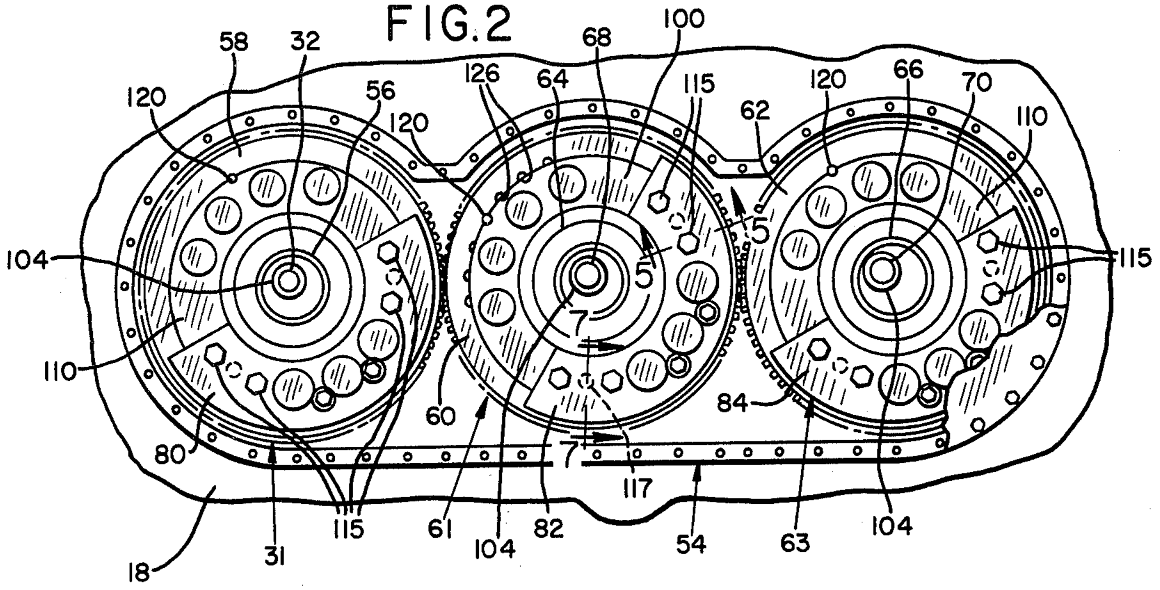
FIG. 2 is a fragmentary side elevation view of the vibrating screen apparatus of FIG. 1 on an enlarged scale with portions thereof broken away.
Figure 4:
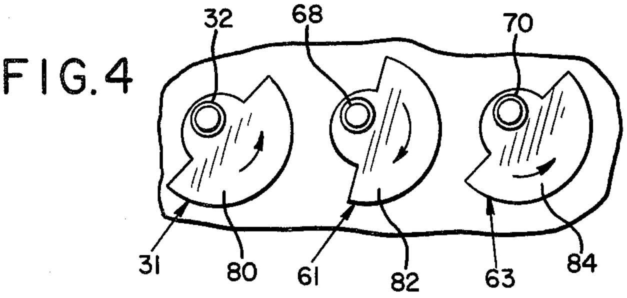
FIG. 4 is a diagrammatic side elevation view showing the relationship of the weights.

Referring now in detail to the drawings, there is shown in FIGS. 1 to 4 a vibrating screen apparatus forming one embodiment of the invention and including a screening unit 10 supported for vibratory movement on a base 12 by four spring assemblies 15. The screening unit includes a frame 16 having side plates 17 and 18 connected by upper and lower horizontal decks 20 and 22 supporting upper and lower screens 24 and 26.

The screening unit 10 is vibrated by a gear driven, phase adjustable, multiple, eccentric weight mechanism including an electric motor 30 mounted on the base 12 and driving an unbalanced shaft assembly 31 including a drive shaft 32 (FIGS. 1, 2 and 3) through a belt 34 (FIG. 1) and sheaves 36 and 38. A spring biased idler sheave 40 (FIG. 1) presses against the belt to accommodate the vibrating movement of the screening unit while maintaining driving contact between the belt and the sheave 38.

The drive shaft 32 extends through a case 50 (FIG. 1) on the side plate 17, and through the side plate 17, a crosstube 52 bolted to the side plates 17 and 18, and extends into a case 54 mounted on the side plate 18. The drive shaft 32 has a hub 56 (FIG. 3) bolted at 109 (FIG. 3) to a gear hub 110 carrying an annular gear 58. The gear 58 meshes with and drives a gear 60 of an unbalanced shaft assembly 61, and the gear 60 meshes with and drives a gear 62 of an unbalanced shaft assembly 63. Any of the three shaft assemblies could be used as the drive assembly should installation conditions require that the machine be so assembled.

The gears 58, 60 and 62 are identical except for certain modifications to gear 60 to be explained. Gear 60 is carried by a gear hub 100, while gear 62 is carried by a gear hub which is numbered 110, because it is identical to the gear hub 110 for gear 58. Gear hub 100 carries a hub 64 (FIG. 2) for a shaft 68 of the shaft assembly 61. There is a hub 66 for a shaft 70 of the shaft assembly 63. The shafts 68 and 70 are like shaft 32, except that shafts 68 and 70 terminate within the case 50 and thus are driven shafts. Each shaft is of lightweight construction and has a hollow central section and is eccentric to its hubs.

Each of the shaft assemblies 31, 61 and 63 has a weight assembly at each end. The weight assemblies are of identical construction except for certain modifications in the two assemblies for shaft assembly 61, which will be described hereinafter. Each weight assembly includes a pair of impulse weights, the weights for case 54 being shown in FIG. 2 and numbered 80, 82 and 84 for shaft assemblies 31, 61 and 63, respectively. The weights are mounted in a manner to be presently discussed. The weights are identical, except as described hereinafter.

Plural weight plugs 85, three being shown, are provided for each shaft assembly. These plugs are received by pockets (FIG. 3) formed in the associated weights and gear hub. The inward weights of each assembly has a lip 87 for each pocket, defining the bottom of the pocket. Bolts 89 have washers overlapping the outer ends of the plugs to retain them in position.

Each shaft assembly has its own weights in phase with one another. The gears 58, 60 and 62 are so meshed that while the pairs of impulse weights 80 and 84 are always in phase with each other, the impulse weights 82 are out of phase with the weights 80 and 84, as is evident from FIGS. 2 and 4. Thus, the gears constrain the shaft assemblies 31 and 63 to rotate in the same direction and opposite to that of the shaft assembly 61. The movement of the weights 82 in a direction opposite to that of weights 80 and 84 means that the weights 82 will be 180° out of phase with weights 80 and 84 twice each revolution, and in phase twice each revolution. However, since the weights 80 and 84 are out of phase with weights 82 at all times except that just mentioned, the term "out of phase" is believed appropriate to describe the phase relationship of such weights.

The gear hub 100 is mounted by a self-aligning bearing 90 on a bearing spindle 92 secured by bolts 93 to the side plate 18 and crosstube 52. The inner race of the bearing is locked in place by a nut 99 on a tapered portion 101 of the spindle 92.

The plates 17 and 18 may be made up of two thick plate members, labeled 96 and 98, for plate 18 in FIG. 3. The plates are unmachined and may, therefore, tend to cock the bearing spindle 92 somewhat off from parallel relative to the longitudinal axis of the associated shaft 32. However, if spindle 92 is cocked, the self-aligning bearing 90 allows the associated hub to remain aligned with shaft 32.

Hub 56 has a tapered bore 111 to receive a tapered sleeve 102. The hub 56 is keyed to the shaft 32 by a drive key 108 having a cleat **108*a* fitting in a notch in the hub 56. The cleat 108*a* and a nut 104** hold the key against endwise movement.

The impulse weights 80, 82 and 84 (FIG. 2) are arcuate and are secured by bolts 115 in laterally aligned pairs to the opposite sides of annular ribs 116 of the associated gear hubs (FIG. 6). Each rib has a flange **116*a* for properly locating the associated gear (FIGS. 3 and 6). It is the weights 80, 82 and 84 that function to clamp the associated annular gears to the associated gear hubs, in a manner to be presently described. Two dowel pins 117 (FIGS. 2 and 7) accurately position the weights of each pair relative to each other so all other holes and parts are in exact alignment. These pins, rather than the bolts 115**, bear circumferential and radial loading forces that the weights develop relative to the gear hub.

A key bolt 120 (FIG. 3) carrying a lock washer (not shown) or other locking device, passes through matching half bores 126, 124 in the gear 58 and the gear hub 110, respectively, and threads into a nut 122 which is welded to gear hub 110 so that it cannot become dislodged. The gears 60 and 62 have similar key bolts 120, but the key bolts 120 for the gears 58 and 62 key such gears and their gear hubs 110 in fixed unadjustable relationship. In fact, the gears 58 and 62 are shrink-fitted onto such hubs.

The half bore in gear 60 is one of a series of half bores to permit relative circumferential adjustment of the gear 60 and the gear hub 100 upon removal of the associated bolt 120.

In U.S. patent application, Ser. No. 638,535 of Louis W. Johnson, the annular gear of the central shaft assembly can be adjusted relative to the associated gear hub. In that arrangement, the gear hub is dimensioned so that when the associated key bolt is removed and when the hub is released by a special built in edge clamp, the annular gear can slide between the weights even though the weights are tightly held in position on the associated gear hub.

I have discovered that in some installations, the wedging arrangement apparently applied an outward bowing force on the annular gear, if the annular gear is made rather thin, which was found objectionable. To overcome that difficulty and to eliminate the necessity of making the annular gear relatively sizable in order to preclude the occurrence of the above difficulties, I provide a different clamping arrangement.

FIG. 6 shows that the annular rib 116 is slightly narrower than the annular gear 60, this difference being exaggerated in FIG. 6, otherwise it would not be visible. This means that when the clamping bolts 115 for the weights are tightened, the weights apply a clamping force onto the annular gear to hold it fixedly in position against lateral dislogement, without imposing any bowing forces on the annular gear.

When the bolts 115 are loosened, and the associated key bolt 120 is removed, the gear hub and weights can be turned relative to the annular gear 60 to establish a new relationship of such weights to the weights of the other shaft assemblies and thus establish a new angle of stroke. The shaft 32 has a tapped hole at 121 to receive a small hex-shaped adapter (not shown) which receives a tool (not shown) to facilitate turning the gear hub and weights.

After the new angle of stroke is achieved, the reverse steps from those recited above can be carried out, with the key bolt now being received in a new half bolt hole 126, to again fixedly mount the annular gear 60 onto its gear hub.

The other annular gears are securely but releasably fixedly mounted on their gear hubs in the same manner as recited above for annular gear 60.

What is claimed is:

1. In a vibrating apparatus, a plurality of unbalanced shaft assemblies, each of which includes a shaft, means establishing a driving relation between said shafts including an annular member surrounding one shaft and a mounting member on said shaft on which said annular member is mounted for relative circumferential adjusting movement with respect thereto, clamping means for releasably clamping said annular member in fixed relationship to said mounting member, said clamping means including a pair of clamping elements on opposite sides of said mounting member and annular member, and means located inwardly of said annular member for forcing said clamping elements into mutual clamping engagement with said mounting member and annular member.

2. A vibrating apparatus as desribed in claim 1, wherein said clamping elements comprise weights.

3. A vibrating apparatus as described in claim 1 in which said mounting member has an annular rim of narrower width than said annular member, said annular member being mounted on said annular rim, said means being located inwardly of said rim.

4. In a vibrating apparatus, a plurality of unbalanced shaft assemblies, each of said shaft assemblies including a shaft and a pair of unbalanced weights for the shaft, drive means interconnecting said shafts and including an annular drive member for one of said shafts, said one shaft being provided with a mounting member for said annular drive member, said weights being disposed on opposite sides of said mounting member in flanking relation thereto and overlapping said annular drive member, said mounting member being narrower than said annular member, bolt means passing through said mounting member and inwardly of said annular member for securing said weights to said mounting member, and causing said weights to clamp said annular drive member in place.

* * * * *